Patented Aug. 25, 1925.

1,550,987

UNITED STATES PATENT OFFICE.

STEFAN SPOGANITZ, OF CHICAGO, ILLINOIS.

PROCESS OF SOLDERING AND COMPOSITION THEREFOR.

No Drawing.   Application filed November 17, 1924.   Serial No. 750,511.

*To all whom it may concern:*

Be it known that I, STEFAN SPOGANITZ, a resident of the United States, citizen of Poland, and whose post-office address is 10524 Erickson Ave., Chicago, Illinois, have invented a new and useful Process of Soldering and Composition Therefor.

This invention relates to the process of compounding and using a salve to be used in soldering and uniting aluminum parts. Heretofore no salve or acid or composition of matter has been made which would make it feasible for anyone to solder aluminum metal. Due to the peculiar characteristics of aluminum metal, great difficulty has been experienced in many attempts which have been made to successfully solder aluminum.

In soldering such metals as lead, copper and zinc for which there does exist a process of soldering, same is affected by the action of acids on the metal parts to be united and such acids as are used, give out and expel poisonous gases when heated, in the process of soldering.

As a necessity by the use of said acids, the work of soldering metal has been dangerous to health and human life, since the air is contaminated with poisonous gases by the acid used in said process of soldering which oftentimes have so poisoned the human system, of the person using them, that death followed.

Instead of depending solely upon acids for the soldering of metals, I employ instead of acid, the following harmless solution which is composed of the following materials and is compounded as follows:

30% by weight of beef tallow.
20% by weight of mutton tallow.
20% by weight of beeswax.
20% by weight of heavy black machine oil.
10% by weight of common resin.

Said combination is united in the following manner:

The mutton tallow, beef tallow and resin are first placed in a kettle and heated and melted together also thoroughly mixed by being cooked or boiled a short time until they take the form of a liquid.

Said kettle must then be allowed to cool with its contents about 24 hours exposed to the air. Next the bees wax and the heavy machine oil are added in the proportions above mentioned and boiled together with the ingredients in said kettle until thoroughly boiled on a fire, the temperature of which must be low to prevent scorching or burning of the compound.

Thus the solution is obtained, which must be allowed to cool 24 hours forming a semi-soft salve.

It may be added that the above substance so combined will solder by using same in place of acid for soldering used heretofore, any metal or metal alloy and especially aluminum metal. The solder is applied in the usual molten or semi-plastic condition, that is, hot.

Claims.

1. The process of soldering aluminum parts which consists in applying hot solder thereto in the presence of a flux consisting of beef tallow, mutton tallow, beeswax, heavy machine oil and common rosin.

2. The process of soldering aluminum parts consists in applying hot solder thereto in the presence of a flux consisting of beef tallow 30%, mutton tallow, 20%, beeswax 20%, heavy machine oil 20% and common rosin 10%.

3. A soldering flux consisting of beef tallow, mutton tallow, beeswax, heavy machine oil and common rosin.

4. A soldering flux consisting of beef tallow 30%, mutton tallow 20%, beeswax 20%, heavy machine oil 20% and common rosin 10%.

STEFAN SPOGANITZ.